United States Patent
Odagiri et al.

(10) Patent No.: US 10,666,171 B2
(45) Date of Patent: May 26, 2020

(54) MOTOR SYSTEM

(71) Applicant: NIDEC CORPORATION, Kyoto (JP)

(72) Inventors: Hideyuki Odagiri, Nagano (JP);
Haruhiro Tsuneta, Nagano (JP); Yuu Ayuzawa, Nagano (JP); Shunya Yazawa, Nagano (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/089,390

(22) PCT Filed: Mar. 9, 2017

(86) PCT No.: PCT/JP2017/009350
§ 371 (c)(1),
(2) Date: Sep. 28, 2018

(87) PCT Pub. No.: WO2017/169604
PCT Pub. Date: Oct. 5, 2017

(65) Prior Publication Data
US 2019/0109549 A1    Apr. 11, 2019

(30) Foreign Application Priority Data
Mar. 30, 2016   (JP) .................................. 2016-067279

(51) Int. Cl.
*H02K 29/08*         (2006.01)
*H02P 6/16*          (2016.01)
(Continued)

(52) U.S. Cl.
CPC ................ *H02P 6/16* (2013.01); *B25J 19/00* (2013.01); *G01D 5/2458* (2013.01);
(Continued)

(58) Field of Classification Search
CPC ................ H02P 6/00; H02P 6/16; H02K 7/10
See application file for complete search history.

(56) References Cited

U.S. PATENT DOCUMENTS 2,363,093 A * 11/1944 Sprake .................... B63B 21/16
226/188

FOREIGN PATENT DOCUMENTS

| JP | S63-117214 | 5/1988 |
|----|------------|--------|
| JP | S64-000414 | 1/1989 |

(Continued)

OTHER PUBLICATIONS

"International Search Report (Form PCT/ISA/210) of PCT/JP2017/009350", dated May 30, 2017, with English translation thereof, pp. 1-4.

*Primary Examiner* — Karen Masih
(74) *Attorney, Agent, or Firm* — JCIPRNET

(57) ABSTRACT

A motor system includes a motor, and a multi-turn absolute encoder that detects a rotation number and an absolute angular position of a rotation shaft of the motor. The multi-turn absolute encoder includes: an absolute angular position detection device that detects the absolute angular position within one rotation period of the rotation shaft; and a storage element that stores the rotation number of the motor. Even if the driving of the multi-turn absolute encoder is stopped while the motor is stopped, the multi-turn absolute encoder detects the multi-turn position of the rotation shaft after startup. Further, the motor has a brake mechanism including: a gear-type brake wheel that rotates integrally with the rotation shaft; an engagement member capable of engaging with the teeth of the gear-type brake wheel; and an actuator which causes the teeth and the engagement member to engage with each other during braking.

8 Claims, 6 Drawing Sheets

(51) Int. Cl.
| | |
|---|---|
| *H02K 11/215* | (2016.01) |
| *H02K 7/10* | (2006.01) |
| *B25J 19/00* | (2006.01) |
| *H02P 6/00* | (2016.01) |
| *G01D 5/245* | (2006.01) |
| *H02K 11/225* | (2016.01) |
| *H02K 11/22* | (2016.01) |
| *G01D 5/249* | (2006.01) |
| *H02K 7/102* | (2006.01) |
| *H02K 24/00* | (2006.01) |
| *H02K 5/173* | (2006.01) |
| *F16D 63/00* | (2006.01) |
| *G01D 5/26* | (2006.01) |

(52) U.S. Cl.
CPC ............ *G01D 5/2497* (2013.01); *H02K 7/10* (2013.01); *H02K 7/1021* (2013.01); *H02K 11/215* (2016.01); *H02K 11/22* (2016.01); *H02K 11/225* (2016.01); *H02K 24/00* (2013.01); *H02P 6/00* (2013.01); *F16D 63/006* (2013.01); *G01D 5/26* (2013.01); *H02K 5/173* (2013.01)

(56) References Cited

FOREIGN PATENT DOCUMENTS

| | | |
|---|---|---|
| JP | H04-60708 | 2/1992 |
| JP | H06-258099 | 9/1994 |
| JP | H09-113314 | 5/1997 |

* cited by examiner

MOTOR SYSTEM

CROSS-REFERENCE TO RELATED APPLICATION

This application is a 371 application of the International PCT application serial no. PCT/JP2017/009350, filed on Mar. 9, 2017, which claims the priority benefit of Japan Patent Application No. 2016-067279 filed on Mar. 30, 2016. The entirety of each of the abovementioned patent applications is hereby incorporated by reference herein and made a part of this specification.

TECHNICAL FIELD

The disclosure relates to a motor system capable of detecting a rotation number and an absolute angular position of a rotation shaft of a motor.

BACKGROUND ART

In motors used in robot joints and so on, a multi-turn absolute encoder equipped with a drum on which a magnetic scale is formed, a magnetic sensor element, a counter, and so on may be provided to make it unnecessary to return to a square point when starting up. In this case, the multi-turn absolute encoder is backed up by a battery to detect a multi-turn position even during a stop period and to hold a detection result (for example, refer to Patent Literature 1).

CITATION LIST

Patent Literature

[Patent Literature 1]
Japanese Unexamined Patent Application Publication No. H6-258099

SUMMARY OF DISCLOSURE

Technical Problem

However, in this configuration in which the multi-turn absolute encoder is backed up by the battery, like the configuration described in Patent Literature 1, since current consumption of the battery is large, it is necessary to periodically replace the battery.

In view of the above problem, an objective of the disclosure is to provide a motor system capable of detecting a multi-turn position of a rotation shaft after startup even if driving of a multi-turn absolute encoder is stopped while the motor is stopped.

Solution to Problem

To solve the above problem, a motor system of the disclosure includes a motor, and a multi-turn absolute encoder which detects a rotation number and an absolute angular position of a rotation shaft of the motor, wherein the multi-turn absolute encoder includes an absolute angular position detection device which detects the absolute angular position within one rotation period of the rotation shaft, and a storage element which stores the rotation number of the motor, and the motor includes a brake mechanism including a gear-type brake wheel which rotates integrally with the rotation shaft, an engagement member which is engageable with teeth of the gear-type brake wheel, and an actuator which engages the teeth with the engagement member at the time of braking.

In the disclosure, since the multi-turn absolute encoder includes the absolute angular position detection device which detects the absolute angular position within one rotation period of the rotation shaft and the storage element which stores the rotation number of the motor, it is possible to detect a multi-turn position of the rotation shaft (the rotation number and the absolute angular position of the rotation shaft) on the basis of the rotation number of the motor stored by the storage element and the absolute angular position within one rotation period of the rotation shaft by the absolute angular position detection device. Further, since the rotation number of the motor is stored by the storage element, it is possible to detect the multi-turn position of the rotation shaft at the time of starting the motor even if the absolute angular position detection device is not driven while the motor is stopped. Also, in the brake mechanism, since the engagement member is engaged with the teeth of the gear-type brake wheel, rotation of the rotation shaft is prevented during the stop. Accordingly, the rotation number of the motor does not vary from the rotation number of the motor stored by the storage element after the stop. Therefore, even if the absolute angular position detection device is not driven while the motor is stopped, it is possible to detect the multi-turn position of the rotation shaft when the motor starts up. Also, since it is sufficient to store the rotation number of the rotation shaft in the storage element while the motor is stopped, a lifetime of a backup battery is long. In addition, when the storage element is a nonvolatile memory, the backup battery for the storage element is unnecessary.

In the disclosure, the storage element may be a nonvolatile memory.

In the disclosure, the absolute angular position detection device may include an incremental encoder, and an absolute position encoder having a resolution lower than that of the incremental encoder. According to such a configuration, it is possible to constitute the absolute angular position detection device having a high resolution with an inexpensive configuration.

In the disclosure, the absolute position encoder may have a permanent magnet of which magnetic poles are disposed in a circumferential direction, and a magnetic sensor element which faces the permanent magnet, and the permanent magnet may rotate integrally with the rotation shaft. According to such a configuration, the absolute position encoder can be configured using a permanent magnet and a magnetic sensor element which generates a driving signal for driving the motor.

In the disclosure, the permanent magnet may be provided on the gear-type brake wheel.

In the disclosure, the magnetic sensor element may be a Hall element.

In the disclosure, the incremental encoder may be an optical encoder, a magnetic encoder or a resolver.

In the disclosure, when the motor starts up, the multi-turn absolute encoder may compare an output value at stop output from the absolute position encoder when the rotation shaft was stopped last with an output value at startup output from the absolute position encoder when the motor was started up, may set the rotation number read out from the storage element as the rotation number of the rotation shaft at the time of starting the motor when the output value at stop is equal to the output value at start, and may set a rotation number corrected for the rotation number read out from the storage element as the rotation number of the rotation shaft at the time of starting the motor when the output value at stop is different from the output value at start. According to such a configuration, when the rotation shaft is intended to stop near the rotation number of the rotation shaft being switched, it is possible to detect the multi-turn position of the rotation shaft at the time of starting the motor even if the rotation shaft rotates slightly.

In the disclosure, the multi-turn absolute encoder may compare three absolute angular positions obtained by interpolating the output value at startup in a relationship between the output value and the absolute angular position of the absolute position encoder n each of the rotation number read out from the storage element, a rotation number obtained by subtracting one turn from the rotation number, and a rotation number obtained by adding one turn to the rotation number with an absolute angular position at stop when the output value at stop is different from the output value at startup at the time of starting the motor, and may set the rotation number corresponding to the absolute angular position closest to the absolute angular position at stop among the three absolute angular positions as the rotation number of the rotation shaft at the time when the motor starts up.

In the disclosure, the incremental encoder may output an index signal at a period corresponding to the resolution of the absolute position encoder, and the multi-turn absolute encoder may correct a detection result of the incremental encoder on the basis of the index signal. According to such a configuration, even if the rotation shaft is slightly shifted during the stop, the position of the rotation shaft can be corrected to an accurate position by a simple process.

In the disclosure, in the gear-type brake wheel, the teeth may coincide with a change point of an output from the absolute position encoder. According to such a configuration, the rotation shaft stops at an angular position which coincides with the change point of the output from the absolute position encoder, and it is possible to avoid stopping of the motor at a position at which the rotation number varies.

Advantageous Effects of Disclosure

In the disclosure, since the multi-turn absolute encoder includes the absolute angular position detection device which detects the absolute angular position within one rotation period of the rotation shaft and the storage element which stores the rotation number of the motor, it is possible to detect a multi-turn position of the rotation shaft (the rotation number and the absolute angular position of the rotation shaft) on the basis of the rotation number of the motor stored by the storage element and the absolute angular position within one rotation period of the rotation shaft by the absolute angular position detection device. Further, since the rotation number of the motor is stored by the storage element, it is possible to detect the multi-turn position of the rotation shaft at the time of starting the motor even if the absolute angular position detection device is not driven while the motor is stopped. Also, in the brake mechanism, since the engagement member is engaged with the teeth of the gear-type brake wheel, rotation of the rotation shaft is prevented during the stop. Accordingly, the rotation number of the motor does not vary from the rotation number of the motor stored by the storage element after the stop. Therefore, even if the absolute angular position detection device is not driven while the motor is stopped, it is possible to detect the multi-turn position of the rotation shaft when the motor starts up. Also, since it is sufficient to store the rotation number of the rotation shaft in the storage element while the motor is stopped, a lifetime of a backup battery is long. In addition, when the storage element is a nonvolatile memory, the backup battery for the storage element is unnecessary.

DESCRIPTION OF EMBODIMENTS (Overall Configuration)

Figure 1:
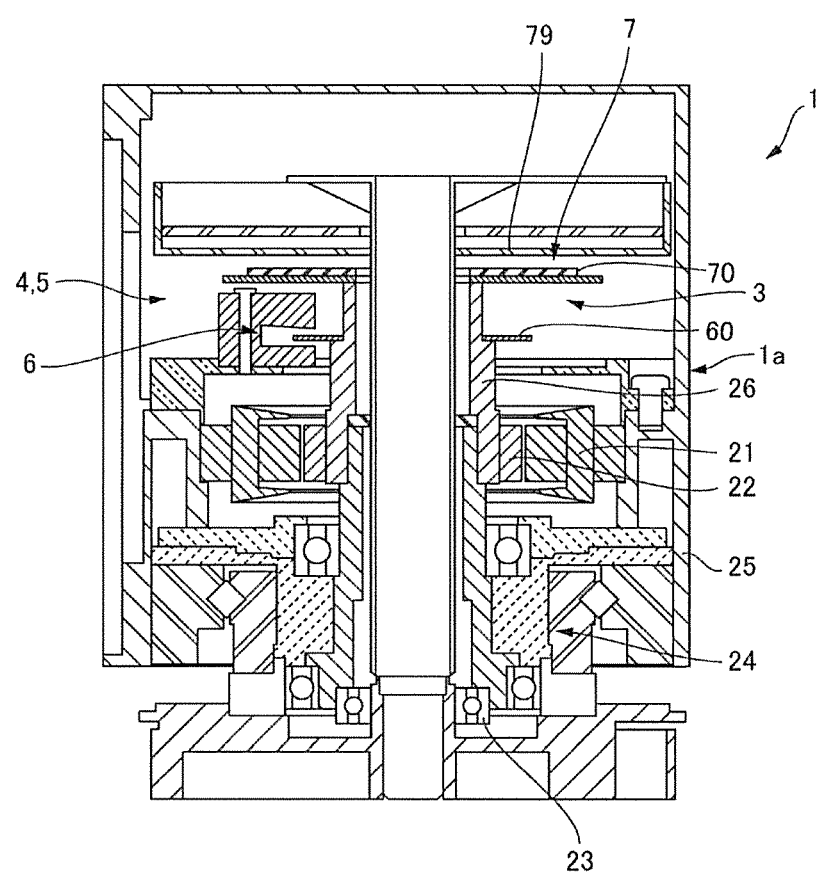
FIG. 1 is a cross-sectional view of a motor system to which the disclosure is applied.
Figure 2:
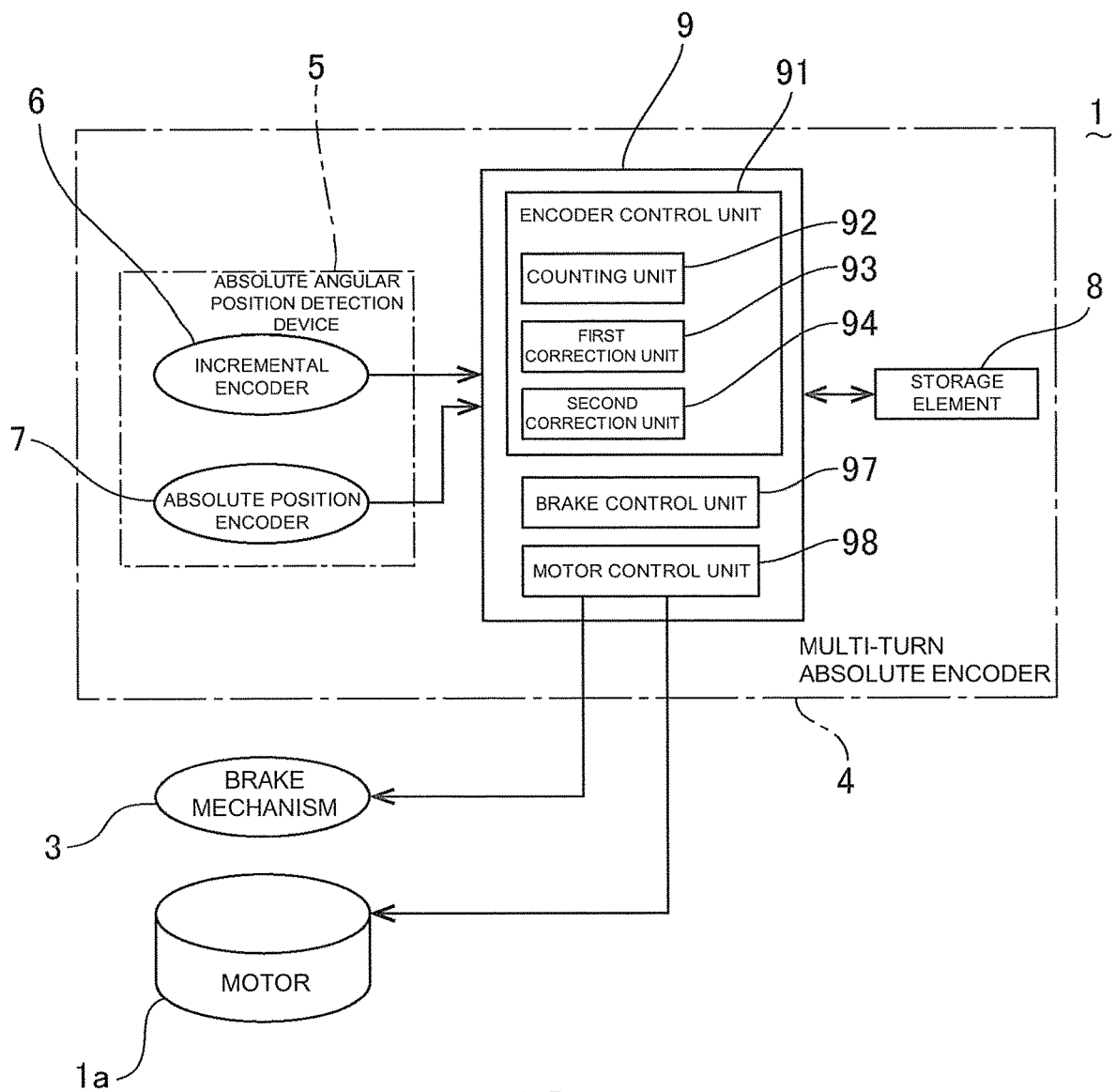
FIG. 2 is block diagram of the motor system shown in FIG. 1.
Figure 3:
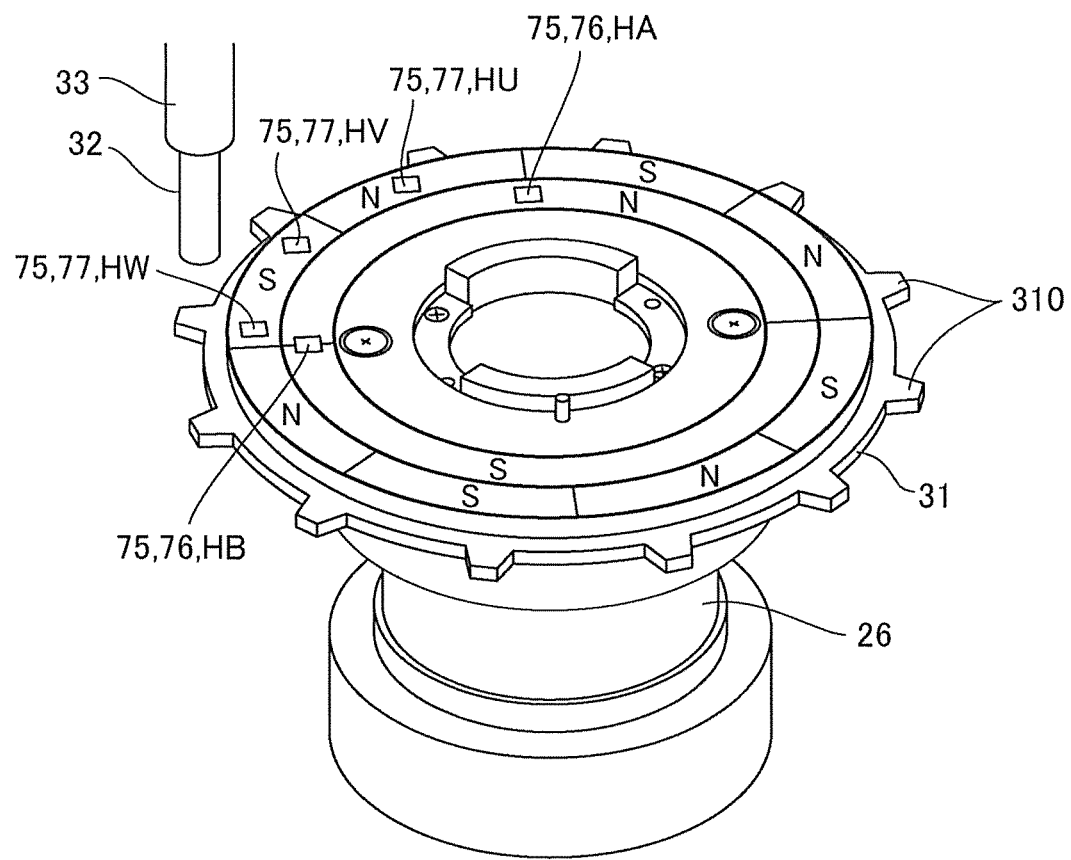
FIG. 3 is an explanatory diagram of a gear-type brake wheel used in a brake mechanism of the motor system shown in FIG. 1.
Figure 4:
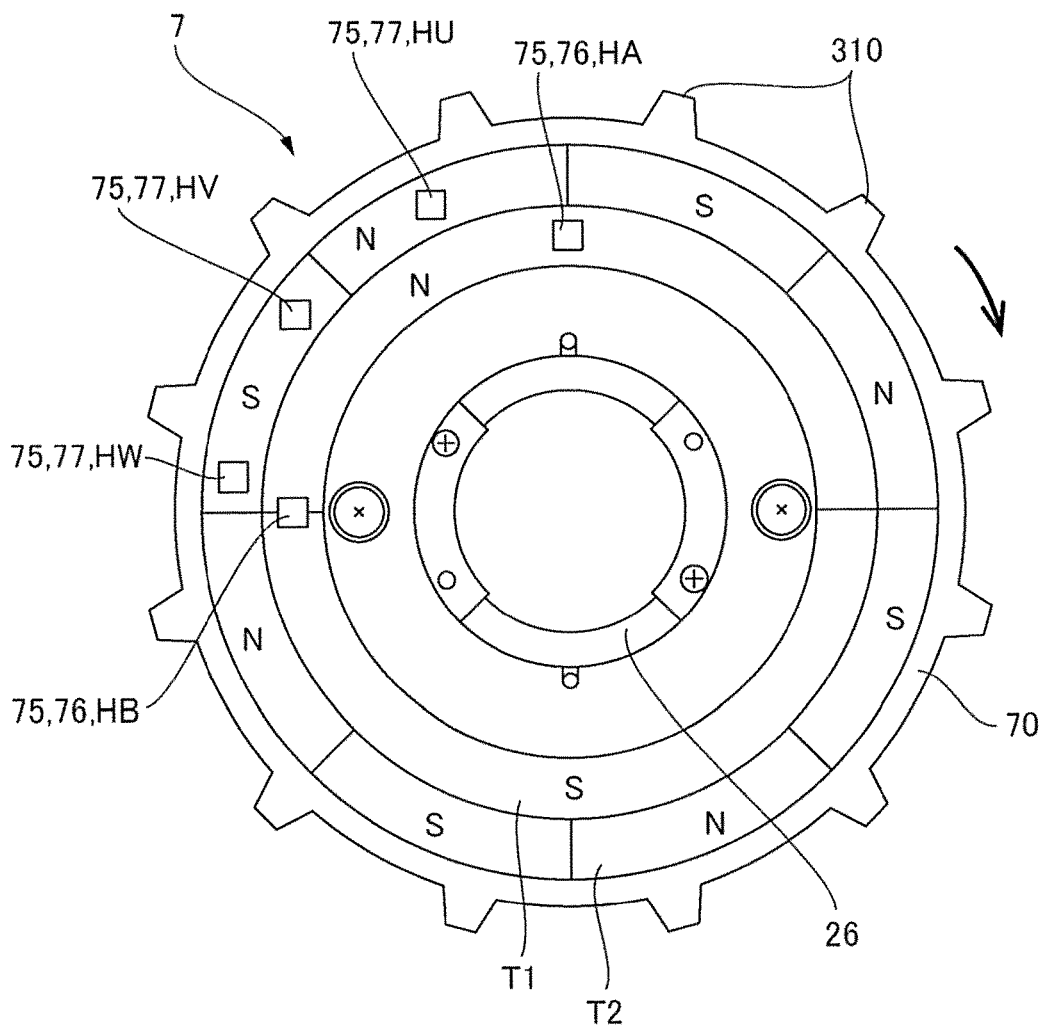
FIG. 4 is an explanatory diagram of an absolute position encoder used in the motor system shown in FIG. 1.

FIG. 1 is a cross-sectional view of a motor system to which the disclosure is applied. FIG. 2 is block diagram of the motor system shown in FIG. 1. FIG. 3 is an explanatory diagram of a gear-type brake wheel used in a brake mechanism of the motor system shown in FIG. 1. FIG. 4 is an explanatory diagram of an absolute position encoder used in the motor system shown in FIG. 1.

As shown in FIG. 1, a motor system 1 to which the disclosure is applied includes a motor 1a having a stator 21, a rotor 22, a bearing 23, a speed reducer 24, a case 25 and so on, a brake mechanism 3 which holds a rotation shaft 26 of the motor 1a in a stopped state when the motor 1a is stopped, and a multi-turn absolute encoder 4 which detects a rotation number and an absolute angular position of the rotation shaft 26.

As shown in FIG. 2, in the motor system 1 of the embodiment, the multi-turn absolute encoder 4 includes an absolute angular position detection device 5 which detects an absolute angular position within one rotation period of the rotation shaft 26, a storage element 8 which stores the rotation number of the rotation shaft 26, and a control unit 9 which calculates a multi-turn position of the rotation shaft 26 or the like on the basis of a detection result by the absolute angular position detection device 5 and the rotation number of the rotation shaft 26. The control unit 9 includes a microcomputer which operates on the basis of a program stored in a ROM (Read Only Memory), a RAM (Random Access Memory), or the like, and includes an encoder control unit 91 which performs calculation of the multi-turn position of the rotation shaft 26 or the like, a brake control unit 97 which performs control of the brake mechanism 3, or the like, and a motor control unit 98 which performs control of the motor 1a, or the like. The encoder control unit 91 includes a counting unit 92 which performs counting or the like for calculating the multi-turn position of the rotation shaft 26, and a first correction unit 93 and a second correction unit 94 which perform correction to be described later. In the embodiment, the storage element 8 is a nonvolatile memory.

In the embodiment, the absolute angular position detection device 5 of the multi-turn absolute encoder 4 has an incremental encoder 6 and an absolute position encoder 7 having a resolution lower than that of the incremental encoder 6.

The incremental encoder 6 is, for example, an optical encoder, and although detailed illustration is omitted, when a disk 60 (refer to FIG. 1) in which an optical pattern is recorded rotates, light passing through a slit for an A phase and a slit for a B phase is blocked or transmitted and then received by a light receiving element facing each of the slits. Incremental data is generated by such a light receiving element. Further, in the optical encoder, as the disk rotates, light passing through a slit for an Z phase is blocked or transmitted and then received by the light receiving element facing the slit for the Z phase, and an index signal is generated. As will be described later with reference to FIG. 4, the absolute position encoder 7 is a magnetic encoder.

(Configuration of Brake Mechanism 3)

FIG. 3 is an explanatory diagram of a gear-type brake wheel 31 used in the brake mechanism 3 shown in FIG. 1. FIG. 4 is an explanatory diagram of the absolute position encoder 7 configured using the gear-type brake wheel 31 shown in FIG. 3.

As shown in FIGS. 3 and 4, the brake mechanism 3 includes the gear-type brake wheel 31 formed of a disk in which teeth 310 are formed on an outer circumferential portion thereof at equiangular intervals, an engagement member 32 which is engageable with the teeth 310 of the gear-type brake wheel 31, and an actuator 33 which drives the engagement member 32. The actuator 33 drives the engagement member 32 during braking of the rotation shaft 26 to engage the teeth 310 with the engagement member 32, holds the rotation shaft 26 in a stopped state and retracts the engagement member 32 from a position at which it engages with the teeth 310 when the rotation shaft 26 rotates.

(Configuration of Absolute Position Encoder 7)

Figure 5:
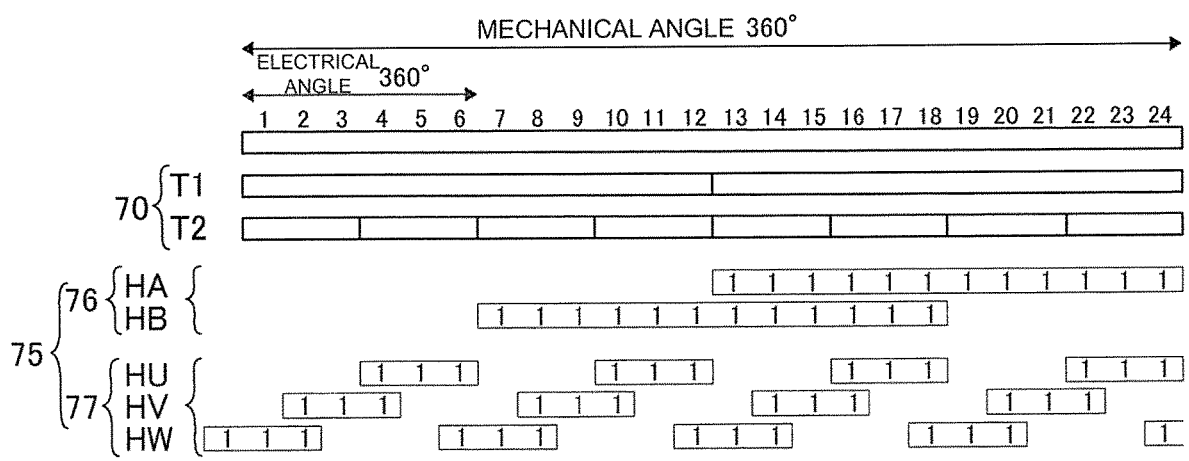
FIG. 5 is an explanatory diagram of an output obtained by the absolute position encoder shown in FIG. 4.

FIG. 5 is an explanatory diagram of an output obtained by the absolute position encoder 7 shown in FIG. 4. As shown in FIGS. 3 and 4, the absolute position encoder 7 includes a permanent magnet 70 of which magnetic poles N and S are disposed in a circumferential direction, and a magnetic sensor element 75 which faces the permanent magnet 70, and the permanent magnet 70 rotates integrally with the rotation shaft 26. In the embodiment, since the permanent magnet 70 is provided on the gear-type brake wheel 31, the permanent magnet 70 rotates integrally with the rotation shaft 26.

The permanent magnet 70 is provided at an outer circumferential portion of one end surface of the gear-type brake wheel 31 in the axial direction (the axial direction of the rotation shaft 26) to extend in the circumferential direction. Here, the permanent magnet 70 includes a first track T1 which is located inward in the radial direction, and a second track T2 which is disposed outward in the radial direction to be parallel to the first track T1. In the first track T1, a total of two poles of which one N pole and one S pole are provided in an equiangular range are formed. In the second track T2, a total of eight poles of which four N poles and four S poles are provided in an equiangular range are formed at equiangular intervals.

The magnetic sensor element 75 faces one side of such a permanent magnet 70 in the axial direction of the rotation shaft 26. In the embodiment, the magnetic sensor element 75 is formed on a common sensor substrate 79 (refer to FIG. 1), and the sensor substrate 79 is fixed to an end plate or the like of the motor 1a. Therefore, the magnetic sensor element 75 is fixed.

The magnetic sensor element 75 is configured with a first magnetic sensor element 76 facing the first track T1 and a second magnetic sensor element 77 facing the second track T2. The first magnetic sensor element 76 is configured with a first Hall element HA and a second Hall element HB provided at a position spaced apart from the first Hall element HA by a mechanical angle of 90°. The second magnetic sensor element 77 is configured with a U phase Hall element HU, a V phase Hall element HV provided at a position spaced apart from the U phase Hall element HU by a mechanical angle of 30°, and a W phase Hall element HW provided at a position spaced apart from the V phase Hall element HV by a mechanical angle of 30°. The second track T2 and the second magnetic sensor element 77 are used as some components of the absolute position encoder 7 and also used as a signal generation magnetic circuit which generates control signals for controlling drive currents for U phase, V phase and W phase drive coils of the motor 1a.

In the absolute position encoder 7 configured as described above, when the rotation shaft 26 rotates one turn, an output shown in FIG. 5 is obtained from each of the magnetic sensor element 75 (the first magnetic sensor element 76 (the first Hall element HA and the second Hall element HB) and the second magnetic sensor element 77 (U phase Hall element HU, V phase Hall element HV and W phase Hall element HW). Therefore, the absolute position encoder 7 can detect an absolute angular position of the rotation shaft 26 with a resolution of a total of 24 sections having an angular range of 15°.

(Basic Operations)

Figure 6:
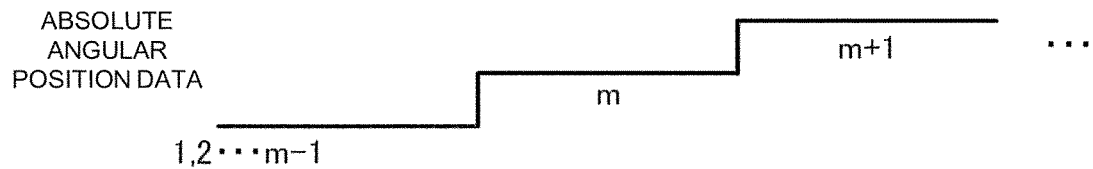
FIG. 6 is an explanatory diagram showing a specific configuration of a method of determining an absolute angular position in the motor system shown in FIG. 1.
Figure 6:
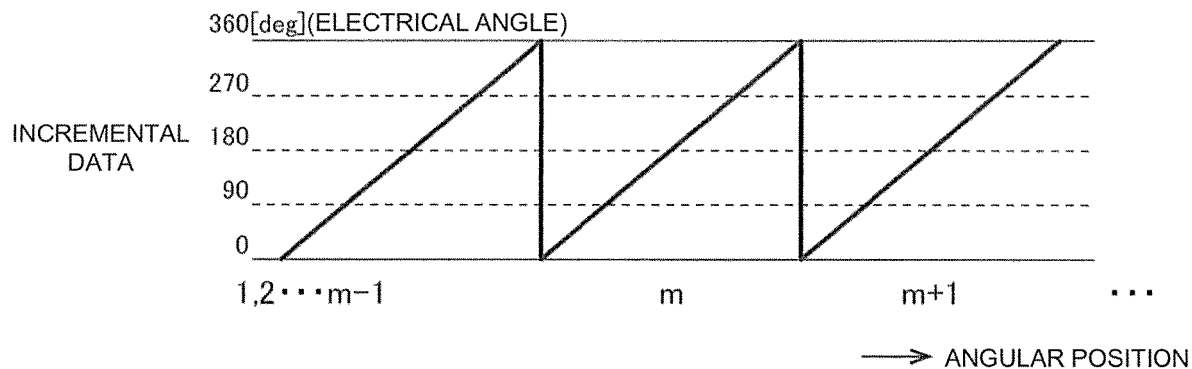

FIG. 6 is an explanatory diagram showing a specific configuration of a method of determining the absolute angular position in the motor system 1 shown in FIG. 1. Further, FIG. 6 shows a state in which an output from the incremental encoder 6 is counted by an up/down counter in each period of the absolute angular positions 1, 2 . . . m−1, m, m+1 detected by the absolute position encoder 7 and is cleared at each period.

In the embodiment, when the rotation shaft 26 rotates, in the multi-turn absolute encoder 4, the rotation number of the rotation shaft 26 is stored in the storage element 8. Also, in the absolute angular position detection device 5 of the multi-turn absolute encoder 4, as shown in FIG. 6, a counting unit 92 of the encoder control unit 91 shown in FIG. 2 detects the absolute angular positions 1, 2 . . . m−1, m, m+1 at the moment of the rotation shaft 26 on the basis of the output from the absolute position encoder 7 and detects the absolute angular position at the moment of the rotation shaft 26 with a higher resolution on the basis of the output from the incremental encoder 6. Therefore, the multi-turn absolute encoder 4 can detect the multi-turn position of the rotation shaft 26 on the basis of the rotation number of the rotation shaft 26 stored in the storage element 8 and the absolute angular position detected by the absolute angular position detection device 5 within one rotation period.

Further, after the motor 1a is stopped and the rotation shaft 26 is held by the brake mechanism 3, the storage element 8 retains the rotation number of the rotation shaft 26 up to that time point. Therefore, when the motor 1a starts up again, the multi-turn absolute encoder 4 can detect the multiple rotation position of the rotation shaft 26 on the basis of the rotation number of the rotation shaft 26 stored in the storage element 8 and the absolute angular position detected by the absolute angular position detection device 5 within one rotation period.

(Main Effects of this Embodiment)

In the above-described motor system 1 of the embodiment, since the rotation number of the motor 1a is stored by the storage element 8, even when the absolute angular position detection device 5 is not driven while the motor 1a is stopped, it is possible to detect the multi-turn position of the rotation shaft 26 when the motor 1a starts up. Further, in the brake mechanism 3, since the engagement member 32 is engaged with the teeth 310 of the gear-type brake wheel 31, rotation of the rotation shaft 26 is blocked during the stop. Therefore, the rotation number of the motor 1a does not vary from the rotation number of the motor 1a stored by the storage element 8 after the stop. Accordingly, even if the absolute angular position detection device 5 is not driven while the motor 1a is stopped, the multi-turn position of the rotation shaft 26 can be detected when the motor 1a starts up again. Also, while the motor 1a is stopped, it is sufficient to store the rotation number of the rotation shaft in the storage element 8, and thus a lifetime of a backup battery is long. In addition, as in the embodiment, if the storage element 8 is a nonvolatile memory, the backup battery of the storage element 8 is unnecessary.

(Relationship Between Teeth 310 of Gear-Type Brake Wheel 31 and Absolute Position Encoder 7)

Figure 7:
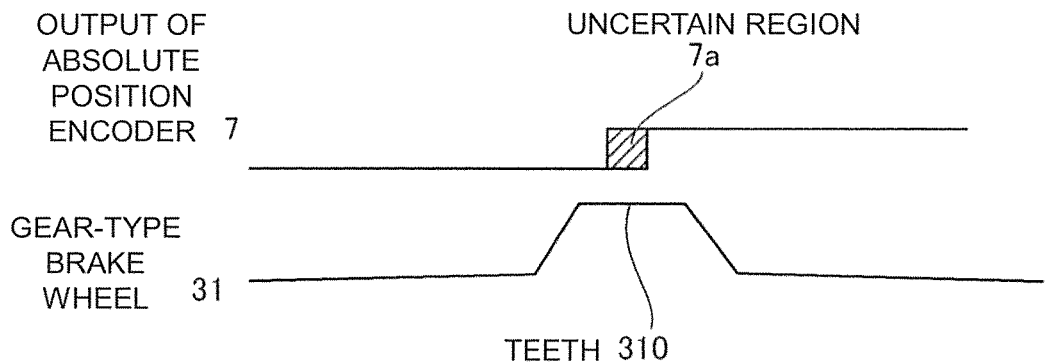
FIG. 7 is an explanatory diagram showing a relationship between teeth of the gear-type brake wheel and the output from the absolute position encoder in the motor system to which the disclosure is applied.

FIG. 7 is an explanatory diagram showing a relationship between the teeth 310 of the gear-type brake wheel 31 and the output from the absolute position encoder 7 in the motor system 1 to which the disclosure is applied. In the motor system 1 to which the disclosure is applied, the gear-type brake wheel 31 is formed with the teeth 310 corresponding to a common divisor of the resolution of the absolute position encoder 7. More specifically, the absolute position encoder 7 has a resolution of a total of 24 sections with the angular range of 15°, and the gear-type brake wheel 31 has twelve teeth 310. Here, the teeth 310 of the gear-type brake wheel 31 are provided at an angular position which coincides with a change point of the output from the absolute position encoder 7.

Therefore, as shown in FIG. 7, a position at which the output from the absolute position encoder 7 changes is an uncertain region 7a in which the detection of the angular position of the rotation shaft 26 becomes uncertain, but it is possible to prevent the rotation shaft 26 from stopping in a state in which the output from the absolute position encoder 7 is in the uncertain region 7a. That is, since the rotation shaft 26 does not stop in a state in which the engagement member 32 runs over the teeth 310, when the teeth 310 of the gear-type brake wheel 31 are provided at positions corresponding to the uncertain region 7a of the absolute position encoder 7, it is possible to prevent the rotation shaft 26 from stopping in the state in which the output from the absolute position encoder 7 is in the uncertain region 7a. Accordingly, it is possible to suppress occurrence of a deviation in the detection result of the absolute position encoder 7 when the motor 1a starts up again after the stop.

(Configuration of Index Signal)

In the motor system 1 of the embodiment, the incremental encoder 6 outputs an index signal, and the first correction unit 93 of the encoder control unit 91 shown in FIG. 2 performs a correction for synchronizing the signal output from the incremental encoder 6 with the signal output from the absolute position encoder 7 at the timing when the index signal is output. At this time, when the index signal is output in one rotation period of the rotation shaft 26, the correction for synchronizing the signal output from the incremental encoder 6 with the signal output from the absolute position encoder 7 is delayed.

Therefore, in the embodiment, the incremental encoder 6 is configured to output the index signal at a period corresponding to the resolution of the absolute position encoder 7. More specifically, in one rotation period of the rotation shaft 26, the incremental encoder 6 outputs the index signal at the timing of 24 times corresponding to the resolution of the absolute position encoder 7. Therefore, the correction for synchronizing the signal output from the incremental encoder 6 with the signal output from the absolute position encoder 7 can be performed at an appropriate timing. Accordingly, the position of the rotation shaft 26 can be corrected to an accurate position by a simple process even if the rotation shaft 26 is slightly shifted during the stop.

(Correction of Rotation Number of Rotation Shaft 26 at Startup)

Figure 8:
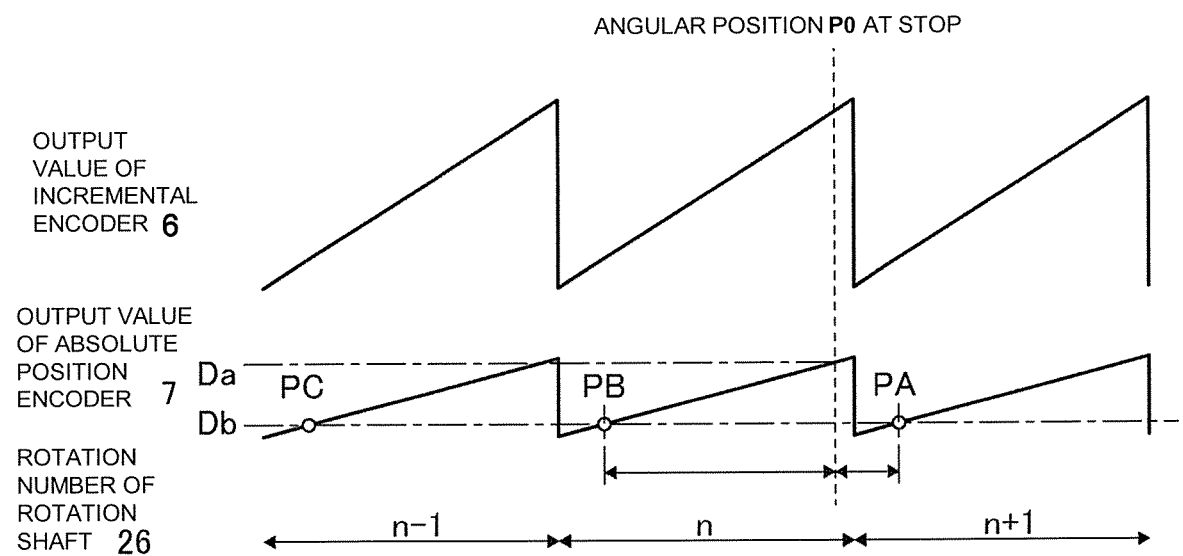
FIG. 8 is an explanatory diagram showing a correction method for the rotation number at startup in the motor system shown in FIG. 1.

FIG. 8 is an explanatory diagram showing a correction method for the rotation number at startup in the motor system 1 shown in FIG. 1. In the motor system 1 of the embodiment, the second correction unit 94 of the encoder control unit 91 shown in FIG. 2 corrects the rotation number stored in the storage element 8 as necessary when the motor 1a starts up. More specifically, when the motor 1a starts up, the second correction unit 94 compares an output value (an output value at stop Da) of the absolute position encoder 7 when the rotation shaft 26 was stopped last with an output value (an output value at startup Db) of the absolute position encoder 7 when the motor 1a was started up.

As a result, when the output value at stop Da is equal to the output value at startup Db, the second correction unit 94 sets the rotation number read out from the storage element 8 as the rotation number of the rotation shaft 26 at the time of starting the motor 1a. On the other hand, when the output value at stop Da is different from the output value at startup Db, the second correction unit 94 sets a rotation number corrected for the rotation number read out from the storage element 8 as the rotation number of the rotation shaft 26 at the time when the motor 1a starts up.

In the embodiment, when the output value at stop Da is different from the output value at startup Db, first, three absolute angular positions PA, PB and PC obtained by interpolating the output value at startup Db in the relationship between the output value and the absolute angular position of the absolute position encoder 7 in each of the rotation number n read out from the storage element 8, the rotation number n−1 obtained by subtracting one turn from the rotation number n, and the rotation number n+1 obtained by adding one turn to the rotation number n are compared with an absolute angular position at stop P0. Additionally, the rotation number corresponding to the absolute angular position closest to the absolute angular position at stop P0 among the three absolute angular positions PA, PB and PC is set as the rotation number of the rotation shaft 26 at the time when the motor 1a starts up. In the example shown in FIG. 8, the rotation number n+1 corresponding to the absolute angular position PA closest to the absolute angular position at stop P0 among the absolute angular positions PA, PB and PC is set as the rotation number of the rotation shaft at the time when the motor 1a starts up.

Therefore, when the rotation shaft 26 is intended to stop near the rotation number of the rotation shaft 26 being switched, it is possible to correct the rotation number of the rotation shaft 26 when the motor 1a starts up even if the rotation shaft 26 rotates slightly due to the delay or the like when the brake mechanism 3 operates. Therefore, it is possible to detect the multi-turn position of the rotation shaft 26 after startup.

Another Embodiment

In the above-described embodiment, the incremental encoder 6 is an optical encoder, but a magnetic encoder or a resolver may be used for the incremental encoder 6. Further, in the above-described embodiment, although the absolute position encoder 7 is a magnetic encoder, an optical encoder may be used for the absolute position encoder 7. In the above-described embodiment, although a Hall element is used as the magnetic sensor element, a magnetoresistive element may be used.

In the above-described embodiment, the absolute angular position detection device 5 is configured by the incremental encoder 6 and the absolute position encoder 7 having a resolution lower than that of the incremental encoder 6, but the absolute angular position detection device 5 may be configured by only an absolute encoder. For example, the absolute angular position detection device 5 may be configured by only an one-rotation absolute encoder in which the magnetoresistive element faces an end surface of the magnet in which a total of two poles including one N pole and one S pole provided in the equiangular range are formed.

REFERENCE SIGNS LIST

1 Motor system
1a Motor
3 Brake mechanism
4 Multi-turn absolute encoder
5 Absolute angular position detection device
6 Incremental encoder
7 Absolute position encoder
7a Uncertain region
8 Storage element
9 Control unit
26 Rotation shaft
31 Gear-type brake wheel
32 Engagement member
33 Actuator
60 Disk
70 Permanent magnet
75 Magnetic sensor element
76 First magnetic sensor element
77 Second magnetic sensor element
79 Sensor substrate
91 Encoder control unit
92 Counting unit
93 First correction unit
94 Second correction unit
97 Brake control unit
98 Motor control unit
310 Teeth
N, S Pole
P0 Absolute angular position at stop
HA First Hall element
HB Second Hall element
HU U phase Hall element
HV V phase Hall element
HW W phase Hall element
T1 First track
T2 Second track
PA, PB, PC Absolute angular position
Da Output value at stop
Db Output value at startup

The invention claimed is:

1. A motor system comprising:
a motor; and
a multi-turn absolute encoder which detects a rotation number and an absolute angular position of a rotation shaft of the motor,
wherein the multi-turn absolute encoder comprises an absolute angular position detection device which detects the absolute angular position within one rotation period of the rotation shaft, and a storage element which stores the rotation number of the motor, and
the motor comprises a brake mechanism including a gear-type brake wheel which rotates integrally with the rotation shaft, an engagement member which is engageable with teeth of the gear-type brake wheel, and an actuator which engages the teeth with the engagement member at the time of braking,
wherein the absolute angular position detection device comprises an incremental encoder, and an absolute position encoder having a resolution lower than that of the incremental encoder,
the absolute position encoder has a permanent magnet of which magnetic poles are disposed in a circumferential direction, and a magnetic sensor element which faces the permanent magnet,
the permanent magnet rotates integrally with the rotation shaft, and
the permanent magnet is provided on the gear-type brake wheel.

2. The motor system according to claim 1, wherein the storage element is a nonvolatile memory.

3. The motor system according to claim 1, wherein the magnetic sensor element is a Hall element.

4. The motor system according to claim 1, wherein the incremental encoder is an optical encoder, a magnetic encoder or a resolver.

5. The motor system according to claim 1, wherein when the motor starts up, the multi-turn absolute encoder compares an output value at stop output from the absolute position encoder when the rotation shaft was stopped last with an output value at startup output from the absolute position encoder when the motor was started up, sets the rotation number read out from the storage element as the rotation number of the rotation shaft at the time of starting the motor when the output value at stop is equal to the output value at start, and sets a rotation number corrected for the rotation number read out from the storage element as the rotation number of the rotation shaft at the time of starting the motor when the output value at stop is different from the output value at start.

6. The motor system according to claim 5, wherein the multi-turn absolute encoder compares three absolute angular positions obtained by interpolating the output value at startup in a relationship between the output value and the absolute angular position of the absolute position encoder in each of the rotation number read out from the storage element, a rotation number obtained by subtracting one turn from the rotation number, and a rotation number obtained by adding one turn to the rotation number with an absolute angular position at stop when the output value at stop is different from the output value at startup at the time of starting the motor, and sets the rotation number corresponding to the absolute angular position closest to the absolute angular position at stop among the three absolute angular positions as the rotation number of the rotation shaft at the time when the motor starts up.

7. The motor system according to claim 1, wherein the incremental encoder outputs an index signal at a period corresponding to the resolution of the absolute position encoder, and the multi-turn absolute encoder corrects a detection result of the incremental encoder on the basis of the index signal.

8. The motor system according to claim 1, wherein in the gear-type brake wheel, the teeth coincide with a change point of an output from the absolute position encoder.

* * * * *